(12) United States Patent
Harris et al.

(10) Patent No.: US 11,885,251 B2
(45) Date of Patent: Jan. 30, 2024

(54) SELECTIVE CATALYTIC REDUCTION CATALYST PRE-HEATING BURNER ASSEMBLY AND METHOD OF CONTROLLING BURNER EMISSIONS

(71) Applicant: Tenneco Automotive Operating Company Inc., Lake Forest, IL (US)

(72) Inventors: Thomas M. Harris, Dexter, MI (US); Matthew G. Muhleck, Dansville, MI (US)

(73) Assignee: Tenneco Automotive Operating Company Inc., Northville, MI (US)

(*) Notice: Subject to any disclaimer, the term of this patent is extended or adjusted under 35 U.S.C. 154(b) by 0 days.

(21) Appl. No.: 17/824,229

(22) Filed: May 25, 2022

(65) Prior Publication Data
US 2023/0383681 A1 Nov. 30, 2023

(51) Int. Cl.
*F01N 3/20* (2006.01)
*F01N 3/10* (2006.01)
(Continued)

(52) U.S. Cl.
CPC ........... *F01N 3/2033* (2013.01); *B01D 39/12* (2013.01); *B01D 46/2403* (2013.01); *B01D 46/521* (2013.01); *B01D 53/945* (2013.01); *B01D 53/9418* (2013.01); *B01D 53/9477* (2013.01); *B01J 23/42* (2013.01); *B01J 35/04* (2013.01); *F01N 3/101* (2013.01); *F01N 3/2066* (2013.01); *F01N 3/2828* (2013.01); *F01N 3/2842* (2013.01); *F01N 3/36* (2013.01);
(Continued)

(58) Field of Classification Search
CPC combination set(s) only.
See application file for complete search history.

(56) References Cited

U.S. PATENT DOCUMENTS

| 4,912,920 A | 4/1990 | Hirabayashi |
| 7,367,182 B2 | 5/2008 | Takahashi et al. |

(Continued)

FOREIGN PATENT DOCUMENTS

| DE | 202009005251 U1 | 12/2009 |
| DE | 102010060136 A1 | 4/2012 |

(Continued)

*Primary Examiner* — Binh Q Tran
(74) *Attorney, Agent, or Firm* — Harness, Dickey & Pierce, P.L.C.

(57) ABSTRACT

A vehicle exhaust system including an exhaust pipe section, a selective catalytic reduction (SCR) catalyst, and a burner assembly, connected to the exhaust pipe section at a position upstream of the selective catalytic reduction (SCR) catalyst, for pre-heating the exhaust system prior to engine start-up. The burner assembly includes a burner with a combustion chamber and a connecting tube that extends between the burner and the exhaust pipe section. A metallic mesh filter element is located inside the connecting tube and/or a catalytic washcoat is disposed on an inner surface of the connecting tube to reduce emissions of the burner assembly at start-up. The catalytic washcoat comprises a mixture of a support material and a catalyst material that chemically reacts with emissions generated by the burner to reduce the amount of burner produced emissions released from the exhaust system during pre-heating.

20 Claims, 5 Drawing Sheets

(51) Int. Cl.
*F01N 3/28* (2006.01)
*F01N 3/36* (2006.01)
*B01J 35/04* (2006.01)
*B01J 23/42* (2006.01)
*B01D 53/94* (2006.01)
*B01D 39/12* (2006.01)
*B01D 46/24* (2006.01)
*B01D 46/52* (2006.01)
*F01N 3/025* (2006.01)

(52) U.S. Cl.
CPC ............... *B01D 2239/1208* (2013.01); *B01D 2255/102* (2013.01); *B01D 2255/908* (2013.01); *B01D 2255/9155* (2013.01); *B01D 2279/30* (2013.01); *F01N 3/025* (2013.01); *F01N 3/0253* (2013.01); *F01N 3/0256* (2013.01); *F01N 3/204* (2013.01); *F01N 2240/14* (2013.01); *F01N 2370/02* (2013.01); *F01N 2610/03* (2013.01); *F01N 2610/08* (2013.01); *F01N 2610/1453* (2013.01); *F01N 2900/1404* (2013.01); *F01N 2900/16* (2013.01); *F01N 2900/1824* (2013.01)

(56) References Cited

U.S. PATENT DOCUMENTS

| | | | |
|---|---|---|---|
| 10,655,520 B2 | 5/2020 | Kruger et al. | |
| 2004/0187483 A1* | 9/2004 | Dalla Betta | F01N 13/009 60/301 |
| 2006/0021331 A1* | 2/2006 | Cizeron | F01N 3/0821 60/286 |
| 2009/0120078 A1 | 5/2009 | Bruck et al. | |
| 2009/0288399 A1* | 11/2009 | Fayard | F01N 3/0256 60/303 |
| 2012/0117949 A1* | 5/2012 | Miebach | F01N 3/0231 60/299 |
| 2015/0192050 A1* | 7/2015 | Meier | F01N 3/2033 60/274 |
| 2015/0211733 A1* | 7/2015 | Shibuya | F23D 11/44 431/350 |
| 2018/0363527 A1* | 12/2018 | Everly | F01N 3/0842 |
| 2020/0232364 A1 | 7/2020 | Baron Von Ceumern-Lindenstjerna et al. | |

FOREIGN PATENT DOCUMENTS

| | | |
|---|---|---|
| DE | 102020200105 A1 | 7/2021 |
| EP | 0561311 B1 | 7/1996 |
| JP | 4614448 B2 | 1/2011 |
| KR | 100191996 B1 | 6/1999 |

\* cited by examiner

SELECTIVE CATALYTIC REDUCTION CATALYST PRE-HEATING BURNER ASSEMBLY AND METHOD OF CONTROLLING BURNER EMISSIONS

FIELD

The present disclosure relates to exhaust burner assemblies for pre-heating a selective catalytic reduction (SCR) catalyst during cold starts of an internal combustion engine, such as a diesel engine. More particularly, the present disclosure provides components and methods for controlling emissions generated by exhaust burner assemblies.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The emission of NOx (oxides of nitrogen) from gasoline and diesel engines are regulated by governments in order to improve and/or maintain air quality, particularly in urban areas. Internal combustion engines and diesel engines in particular also generate hydrocarbon emissions in the form of particulate matter (PM) or soot and carbon monoxide (CO) emissions. Thus, many modern vehicles are equipped with exhaust treatment systems to reduce the amount of NOx, CO, and PM emissions in the exhaust.

The exhaust treatment system may include a diesel oxidation catalyst (DOC). The DOC removes hydrocarbons and/or carbon oxides from the exhaust. The exhaust treatment system may also include a diesel particulate filter (DPF), which removes particulate matter (PM) from the exhaust. The exhaust treatment system may also include a selective catalytic reduction (SCR) catalyst. A diesel exhaust fluid (DEF) injector injects a DEF (e.g., a urea-water solution) as a chemical reductant into a decomposition tube or reactor, located upstream of the SCR catalyst. When the DEF encounters hot exhaust in the decomposition tube, the water portion undergoes evaporation and the urea undergoes decomposition to form ammonia. The ammonia ($NH_3$) provided by the DEF is adsorbed by the SCR catalyst. When ammonia is present on the surface of the SCR catalyst, and the catalyst is hot, NOx in the exhaust will react with the ammonia to form nitrogen ($N_2$). In this way the amount of NOx emitted by the engine is reduced.

The SCR catalyst is most effective at reacting with NOx in the exhaust when the SCR catalyst is operating at elevated temperatures well above typical ambient temperatures. The successful application of SCR to the control of NOx emissions during a cold start of the engine is therefore a challenge due to the need to heat up the SCR catalyst, as well as all components of the exhaust system upstream of the SCR catalyst, as quickly as possible. Exhaust temperatures at engine startup are generally low, such that higher levels of NOx may be emitted from a vehicle on startup. Thus, a need exists to warm the SCR catalyst before engine startup occurs so that it can begin reacting with NOx during or shortly after engine startup.

One common way of pre-heating the SCR catalyst before engine startup is through the use of a burner assembly in the exhaust system, which is placed upstream of the SCR catalyst. The burner assembly is activated prior to engine startup and burns fuel to warm the SCR catalyst. Typical burner assemblies are devices that bring fuel (e.g., diesel fuel) together with air in a combustion chamber, where the air-fuel mixture is ignited by an igniter (e.g., a spark plug or glow plug). In many systems, the fuel for the burner is provided by a fuel pump and the air is provided to the burner by an air pump. The combustion generated in the burner rapidly heats the exhaust and exhaust system components and enables the SCR catalyst to become quickly activated to speed up the reaction of NOx with ammonia. The desired end result of this "pre-heating" process is the reduction of NOx emissions in the exhaust to near zero (or eliminating NOx completely from the exhaust).

However, the burner itself generates emissions during the "pre-heating" process. To ignite the burner, a low air-to-fuel ratio (AFR) is used, which corresponds to a "rich" combustion environment in the burner. Typically, this ignition process persists for 5-15 seconds. During that time, the CO concentration in the exhaust generated by the burner can be quite high. When the burner transitions from ignition mode to normal operation, a higher "lean" AFR is utilized and the CO concentration in the exhaust flowing from the combustion chamber drops to a very low value (possibly zero depending on the burner design and operating conditions).

It is desirable for the emissions (specifically, NOx, CO, and hydrocarbons) generated by the burner to be minimal while the burner is being used for pre-heating. Low emissions are facilitated by the combustion being conducted with the highest air-to-fuel ratio (AFR) possible, but at the same time stable combustion cannot be maintained if the AFR is raised to high ratios. As a result, there remains a need for solutions that can reduce NOx, CO, and hydrocarbon emissions from the burner assembly during the "pre-heating" process.

SUMMARY

This section provides a general summary of the disclosure and is not a comprehensive disclosure of its full scope or all of its features.

In accordance with an aspect of the present disclosure, an exhaust system for a vehicle is provided, which includes an exhaust pipe section that defines a main exhaust passageway and a selective catalytic reduction (SCR) catalyst that is arranged in fluid communication with and positioned downstream of the exhaust pipe section. The exhaust system also includes a burner assembly, connected to the exhaust pipe section, for pre-heating the exhaust system and the selective catalytic reduction (SCR) catalyst in particular, prior to engine start-up. The burner assembly includes a burner with a combustion chamber and a connecting tube that extends between the burner and the exhaust pipe section.

The connecting tube includes an inner surface that defines a connecting tube passageway, which is arranged in fluid communication with the combustion chamber of the burner and the main exhaust passageway in the exhaust pipe section. A catalytic washcoat is disposed on the inner surface of the connecting tube. The catalytic washcoat comprises a mixture of a support material and a catalyst material. The catalyst material in the catalytic washcoat is made of one or more platinum group metals (PGM) and chemically reacts with emissions generated by the burner. As a result, the catalytic washcoat reduces the amount of burner produced emissions that are released from the exhaust system (i.e., tailpipe emissions) during the initial pre-heating stage, when the air-fuel ratio in the combustion chamber of the burner is fuel rich.

In accordance with another aspect of the present disclosure, a filter element is positioned in the connecting tube passageway. The filter element is made of a metallic mesh and has a porosity that permits exhaust flow through the filter element while trapping particulate matter generated by the burner. Particulate matter is primarily generated by the burner during initial start-up, when the air-fuel ratio is fuel rich. Even during initial start-up, the amount of particulate matter (e.g., soot) that is generated by the burner is small compared to the amount of particulate matter that diesel engines often generate. Thus, the soot capacity of the filter element does not need to be large, particularly since nitrogen dioxide ($NO_2$) and the high temperatures produced by the burner after initial start-up (i.e., during lean combustion) causes the particulate matter that is trapped in the filter element to burn-off rather quickly.

According to another aspect of the present disclosure, a method for pre-heating an exhaust system of a vehicle is provided. The method includes the steps of injecting fuel into the combustion chamber of a burner assembly positioned upstream of the selective catalytic reduction (SCR) catalyst at a first fuel injection rate and supplying air to the combustion chamber of the burner assembly at a first flowrate. Thus, the first flowrate of the air and the first fuel injection rate define a first air/fuel ratio within the combustion chamber. The method proceeds with the steps of igniting an air/fuel mixture within the combustion chamber of the burner assembly to generate heat and emissions within the combustion chamber and maintaining the first air/fuel ratio for a pre-determined start-up period. The method then proceeds with the step of starting an engine of the vehicle a period of time after the ignition of the air/fuel mixture within the combustion chamber of the burner assembly.

The method further comprises the step of routing the heat and emissions generated in the combustion chamber through a connecting tube that includes a catalytic washcoat. As explained above, the connecting tube leads to an exhaust pipe section that is positioned upstream of the selective catalytic reduction (SCR) catalyst. The catalytic washcoat in the connecting tube initiates a chemical reaction with the emissions passing through the connecting tube to reduce nitrogen oxide (NOx), carbon monoxide (CO), and hydrocarbon (HC) concentrations in the emissions generated by the burner assembly during the pre-determined start-up period.

Advantageously, the exhaust systems and related methods described herein reduce tailpipe emissions during the pre-heating of the exhaust system and selective catalytic reduction (SCR) catalyst by the burner assembly. One particularly challenging aspect of future low-NOx emissions regulations relates to conversion of NOx produced by the engine during a cold start. The solutions described herein address the challenges associated with cold start emissions by enabling an exhaust burner to pre-heat the aftertreatment system before the engine is started without generating an unacceptable emission of pollutants during that operation. Thus, the exhaust burner assembly described herein helps customers meet these new requirements and provides great flexibility in where the burner assembly is placed in the exhaust system. For example, in some customer applications, the burner must be located downstream of the components of the aftertreatment system that would help to control emissions from the burner due to packaging constraints or other requirements. Because the burner assembly described herein reduces the emissions generated by the burner assembly during pre-heating, there is more freedom to choose the burner location.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Referring to the Figures, wherein like numerals indicate corresponding parts throughout the several views, various exhaust burner assemblies 20, 20', 20" are illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1A:
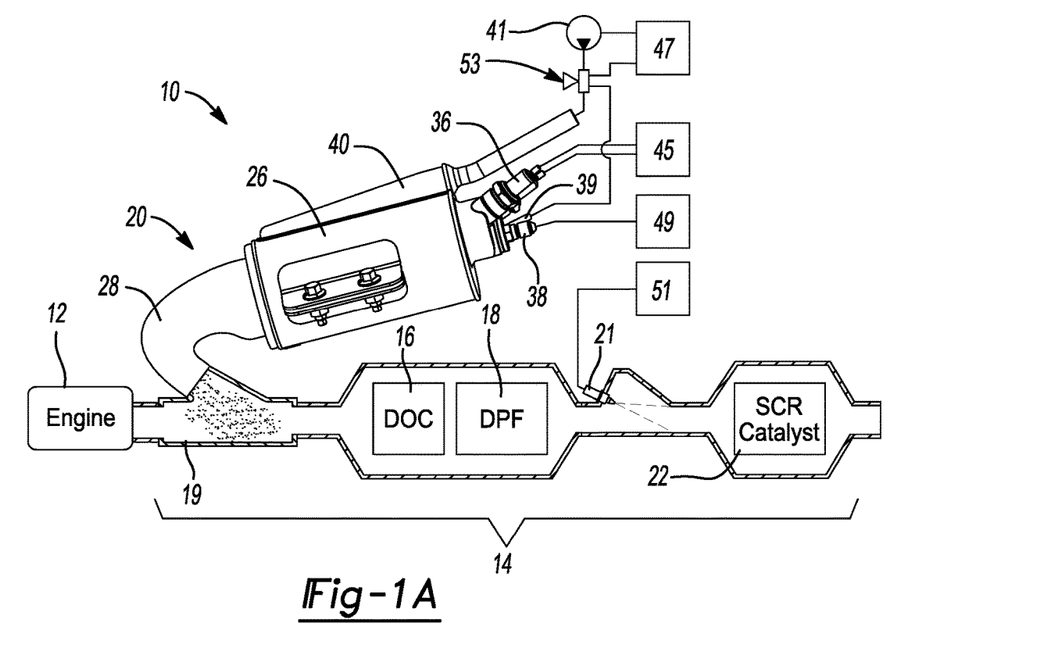
FIG. 1A is a schematic diagram illustrating an exemplary exhaust system which includes an exemplary burner assembly of the present disclosure that is positioned upstream of a diesel oxidation catalyst (DOC), diesel particulate filter (DPF), and selective catalytic reduction (SCR) catalyst.
Figure 1B:
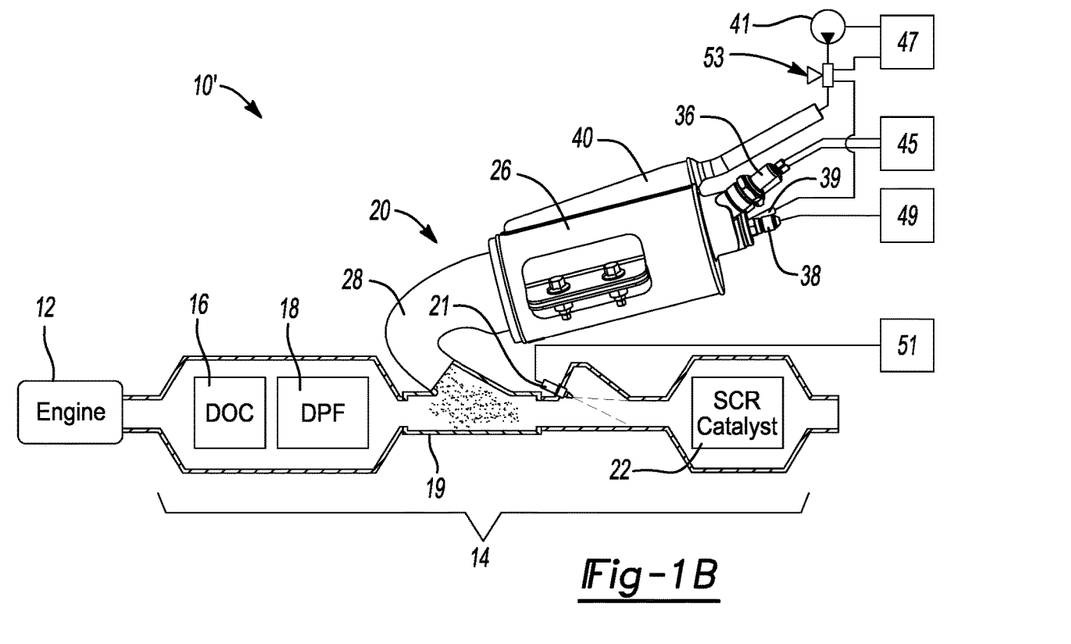
FIG. 1B is a schematic diagram illustrating another exemplary exhaust system which includes an exemplary burner assembly of the present disclosure that is positioned downstream of the diesel oxidation catalyst (DOC) and diesel particulate filter (DPF), but upstream of the selective catalytic reduction (SCR) catalyst.

FIGS. 1A and 1B show exemplary exhaust systems 10, 10' for a vehicle, such as a truck, tractor, or automobile. An engine 12 generates exhaust, which passes through the exhaust system 10, 10' before being expelled into the environment. While the engine 12 is shown and will be discussed as a diesel engine, the engine 12 may be another suitable type of engine. Exhaust is expelled from the engine 12 into the exhaust system 10, 10'. The exhaust may include particulate matter (PM) and/or unburned hydrocarbons (HC) and gaseous emissions such as nitrogen oxides (NOx) (e.g., nitrogen oxide (NO) and nitrogen dioxide ($NO_2$)) and carbon oxides (e.g., carbon monoxide (CO) and carbon dioxide ($CO_2$)).

To reduce these emissions, each of the exhaust systems 10, 10' shown in FIGS. 1A and 1B includes an exhaust treatment system 14. The exhaust treatment system 14 may include a number of different components and sub-assemblies. In the illustrated examples, the exhaust treatment system 14 generally includes a diesel oxidation catalyst (DOC) 16, a diesel particulate filter (DPF) 18, an exhaust burner assembly 20, and a selective catalytic reduction (SCR) catalyst 22. In the exhaust system illustrate in FIG. 1A, the exhaust burner assembly 20 is positioned downstream of the engine 12, but upstream of the diesel oxidation catalyst (DOC) 16 and the other components of the exhaust treatment system 14. In the alternative configuration illustrated in FIG. 1B, the exhaust burner assembly 20 is located downstream of the diesel oxidation catalyst (DOC) 16 and the diesel particulate filter (DPF) 18, but upstream of the selective catalytic reduction (SCR) catalyst 22. However, these are just examples. It should be appreciated that the components of the exhaust treatment system 14 shown in the Figures can be arranged in different orders, can be placed in parallel with other components, and may be eliminated or duplicated depending on the requirements of a particular application.

Figure 2:
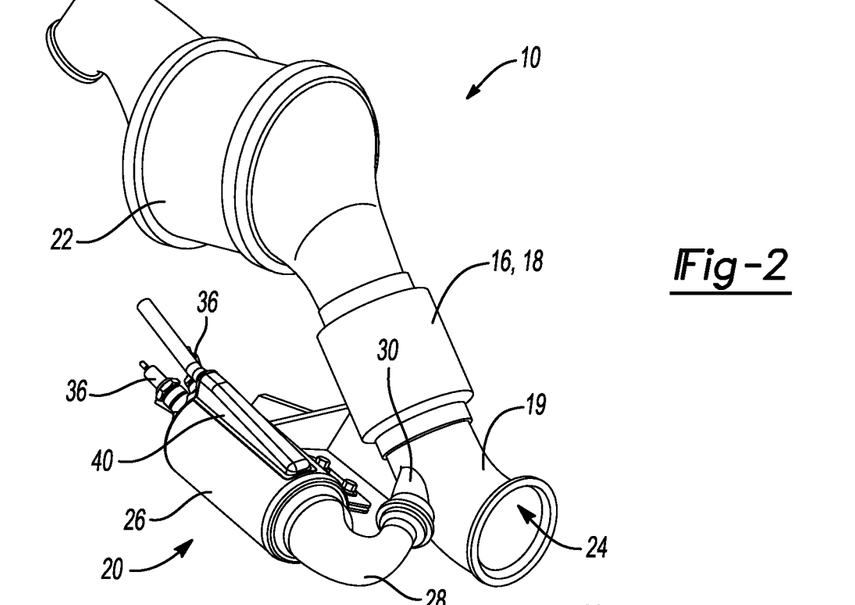
FIG. 2 is side perspective view of a portion the exemplary exhaust system shown in FIG. 1, which includes the exemplary burner assembly.

In the exemplary exhaust systems 10, 10' shown in FIGS. 1A, 1B, and 2, the exhaust flows from the engine 12 to the diesel oxidation catalyst (DOC) 16. The diesel oxidation catalyst (DOC) 16 is constructed to reduce carbon monoxide (CO), hydrocarbons (HC), and particulate matter (PM) emissions in the exhaust. The exhaust output from the diesel oxidation catalyst (DOC) 16 flows to the diesel particulate filter (DPF) 18. The diesel particulate filter (DPF) 18 filters particulate matter (PM) from the exhaust. In various implementations, the diesel oxidation catalyst (DOC) 16 and the diesel oxidation catalyst (DOC) 16 may be implemented within the same housing. The exhaust then flows from the diesel oxidation catalyst (DOC) 16 to exhaust pipe section 19, which extends to the selective catalytic reduction (SCR) catalyst 22. The exhaust burner assembly 20, which will be discussed in greater detail below, is connected to the exhaust pipe section 19, which can be located in several different positions along the length of the exhaust system 10, 10' so long as the exhaust pipe section 19 and exhaust burner assembly 20 are positioned upstream of the selective catalytic reduction (SCR) catalyst 22.

A diesel exhaust fluid (DEF) injector 21 is also connected to the exhaust pipe section 19 downstream of the exhaust burner assembly 20, but upstream of selective catalytic reduction (SCR) catalyst 22. The diesel exhaust fluid (DEF) injector 21 injects diesel exhaust fluid (DEF) into the exhaust pipe section 19 upstream of the selective catalytic reduction (SCR) catalyst 22. Diesel exhaust fluid (DEF) is comprised of urea (e.g., $CO(NH_2)_2$) and water. When the engine 12 is running, the urea in the diesel exhaust fluid (DEF) that is injected into the exhaust pipe section 19 by the diesel exhaust fluid (DEF) injector 21 reacts with the hot exhaust to produce ammonia, which is carried with the exhaust to the selective catalytic reduction (SCR) catalyst 22. Heat evaporates the water in the diesel exhaust fluid (DEF) and the selective catalytic reduction (SCR) catalyst 22 stores (i.e., adsorbs) the ammonia and catalyzes a reaction between the stored ammonia and nitrogen oxides (NOx) passing by the selective catalytic reduction (SCR) catalyst 22. This chemical reaction produces nitrogen and water and operates to remove the nitrogen oxides (NOx) from the exhaust. However, there is a direct correlation between the temperature of the selective catalytic reduction (SCR) catalyst 22 and the maximum amount of nitrogen oxides (NOx) the selective catalytic reduction (SCR) catalyst 22 can remove from the exhaust. In other words, the selective catalytic reduction (SCR) catalyst 22 is most effective at removing nitrogen oxides (NOx) from the exhaust when the selective catalytic reduction (SCR) catalyst 22 is at elevated temperatures.

The nitrogen oxide (NOx) emissions of a vehicle can be relatively high during and immediately following engine startup. This effect is exacerbated by a cold and therefore less effective selective catalytic reduction (SCR) catalyst 22, which has not yet been warmed by the exhaust flow from the engine 12. To address this problem, the exhaust burner assembly 20 is utilized to warm the selective catalytic reduction (SCR) catalyst 22 and bring it up to an effective operating temperature while the engine 12 is off, before an engine startup. The burner assembly 20 is connected to the exhaust system 10 and may be arranged either upstream or downstream of the diesel oxidation catalyst (DOC) 16 and either upstream or downstream of the diesel particulate filter (DPF) 18, but the burner assembly 20 must be arranged upstream of the selective catalytic reduction (SCR) catalyst 22 in order to provide effective heating to that component of the exhaust treatment system 14.

Figures 3, 4:
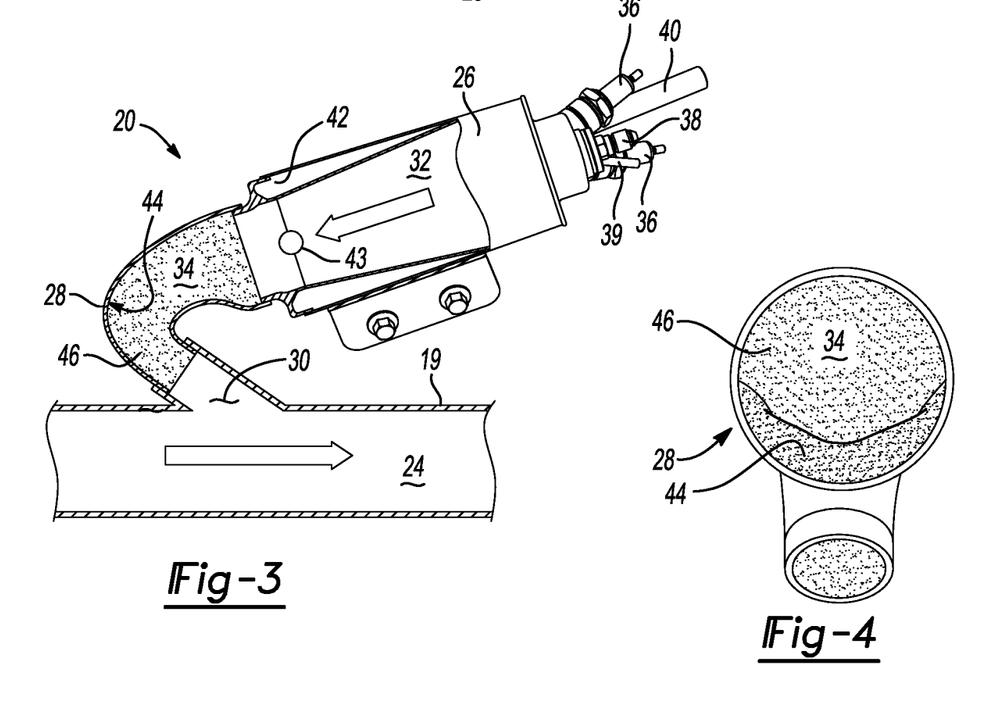
FIG. 3 is a side section view of the exemplary burner assembly illustrated in FIGS. 1 and 2.
FIG. 4 is a front section view of the exemplary burner assembly illustrated in FIG. 3 taken along section line 4-4.

With additional reference to FIGS. 3 and 4, the exhaust pipe section 19 defines a main exhaust passageway 24 that is arranged in fluid communication with the selective catalytic reduction (SCR) catalyst 22. The burner assembly 20 includes a burner 26 and a connecting tube 28 that extends between the burner 26 and a connection port 30 in the exhaust pipe section 19, which is located upstream of the diesel exhaust fluid (DEF) injector 21.

The burner 26 has a combustion chamber 32 and the connecting tube 28 has a connecting tube passageway 34 that is arranged in fluid communication with the combustion chamber 32 of the burner 26 and the main exhaust passageway 24 in the exhaust pipe section 19. The burner assembly 20 also includes one or more fuel injectors 36, an ignition device 38 (such as a spark plug or glow plug), an air injection conduit 39, and an air manifold 40. The air injection conduit 39 and air manifold 40 are connected to an air pump or other pressurized air source 41.

The fuel injectors 36 inject fuel (e.g., diesel fuel) into the combustion chamber 32. In the combustion chamber 32, the fuel mixes with the air supplied to the combustion chamber 32 by the air injection conduit 39 and air manifold 40. The air injection conduit 39 and air manifold 40 are connected in fluid communication with an air source, such as an air pump 41, for example. The ignition device 38 ignites the air/fuel mixture in the combustion chamber 32 to initiate sustained combustion therein. In the example where the ignition device 38 is a spark plug, the ignition device 38 generates spark within the combustion chamber 32 to ignite the air/fuel mixture in the combustion chamber 32.

Although other configurations are possible, the burner 26 in the illustrated example operates by splitting the air flow, provided by the air pump 41, into two flows, one that enters the combustion chamber 32 near the fuel injectors 36 through the air injection conduit 39 and enables combustion of the fuel, and the other that flows from the air manifold 40 and through an annular cavity 42 surrounding the combustion chamber 32 that cools the walls of the combustion chamber 32 and also limits heat loss to the external environment. The air in the annular cavity 42 then enters the combustion chamber 32 through an air port 43 in the wall of the combustion chamber 32 such that the two flows of air through the burner 26 are recombined near the exit of the combustion chamber 32, where the burner connects to the connecting pipe 28. The entrance location of the cooling air flow into the combustion chamber 32 through the air port 43 creates a swirling flow pattern within the combustion chamber 32 and therefore in the hot gases that enter the connecting pipe 28 from the burner 26.

The hot gases generated by the combustion of the air/fuel mixture in the combustion chamber 32 is used to heat one or more components of the exhaust system 10, 10', including the selective catalytic reduction (SCR) catalyst 22, which brings the components of the exhaust system 10, 10' up to an operating temperature prior to start-up of the engine 12. Stated differently, combustion within the burner 26 produces heat and burner-generated exhaust (i.e., emissions). The heat generated by the burner 26 pre-heats the selective catalytic reduction (SCR) catalyst 22, but burner-generated emissions are a by-product. Certain aspects of the exhaust burner assemblies 20, 20', 20" described herein are designed to reduce or eliminate the burner-generated emissions, particularly during the first few seconds of combustion, when the air/fuel mixture in the combustion chamber 32 of the burner 26 is fuel-rich.

The exhaust treatment system 14 may also include one or more control modules 45, 47, 49, 51 that are configured to control one or more components and/or functions of the exhaust treatment system 14. For example, the exhaust treatment system 14 may have a fuel control module 45 that is electrically connected to the fuel injectors 36 and programmed to actuate the fuel injectors 36 and begin fuel injection into the combustion chamber 32 of the burner 26 before an engine startup. The exhaust treatment system 14 may also include an air control module 47 that is programmed to supply air to the air injection conduit 39 and air manifold 40 and thus the combustion chamber 32 of the burner 26 before the engine startup. For example, the air control module 47 may be electrically connected to the air pump 41 and programmed to turn the air pump 41 on before engine startup. Alternatively or additionally, the exhaust treatment system 14 may include one or more electronic valves 53 positioned between the air pump/air source 41 and the air injection conduit 39 and air manifold 40. The air control module 47 may be electrically connected to the electronic valves 53 and programmed to actuate/open the electronic valves 53 to selectively provide air to the air injection conduit 39 and/or air manifold 40 for delivery to the combustion chamber 32 of the burner 26 before engine startup. The exhaust treatment system 14 may also include an ignition control module 49 that is programmed to send electricity to the ignition device (e.g., spark plug) 38 to ignite the air/fuel mixture within the combustion chamber 32 of the burner 26 and initiate combustion in the burner 26 before engine startup. The exhaust treatment system 14 may also include a diesel emissions fluid (DEF) control module 51 that is programmed to actuate the diesel emissions fluid (DEF) injector 21 and begin diesel emissions fluid (DEF) injection (i.e., dosing) before engine startup.

The fuel control module 45 may be programmed to adjust the frequency, duration, and/or amount of fuel that is injected into the combustion chamber 32 of the burner 26. Also, the air control module 47 may be programmed to vary the speed of the air pump 41 or change the frequency, number, or duration of opened valves 53 to vary the amount of air that is fed into the combustion chamber 32 of the burner 26. As a result, the fuel control module 45 and/or the air control module 47 may be used to set, change, or adjust operating air/fuel ratios inside the combustion chamber 32 of the burner 26.

Thus, warming of the exhaust system 10, 10' before engine startup is performed by operation of the burner 26. During the warming/pre-heating process, the amount of air and fuel that is fed into the combustion chamber 32 of the burner 26 may be adjusted initially to a fuel rich air-fuel ratio to promote ignition and stable combustion of the air/fuel mixture inside the combustion chamber 32 of the burner 26 and then adjusted again to a leaner air-fuel ratio after five to fifteen seconds to drive heat further downstream in the exhaust system 10, 10'. These times may be varied by the system depending on the ambient temperature and/or the temperature of the exhaust system 10, 10' prior to burner startup, which may be based on temperature measurements or the amount of time that has passed since the engine 12 was shut off.

The selective catalytic reduction (SCR) catalyst 22 is cold when warming/pre-heating first begins. Operation of the burner 26 gradually heats up the substrates of the selective catalytic reduction (SCR) catalyst 22. Once the substrates of the selective catalytic reduction (SCR) catalyst 22 are hot and heat is also reaching the decomposition tube, then diesel emissions fluid (DEF) dosing may be initiated. However, if the pre-heating period is relatively long and the burner 26 continues to operate (in order to warm up the entire exhaust system 10, 10'), the diesel emissions fluid (DEF) dosing may be stopped because the ammonia ($NH_3$) capacity of the selective catalytic reduction (SCR) catalyst 22 is decreasing as the temperature increases. While the engine 12 is running after startup, the burner 26 may be deactivated once the exhaust system 10, 10' has reached a minimum operating temperature and the supplemental heat provided by the burner 26 is no longer needed.

The combustion chamber 32 of the burner 26 is separated from, but connected to the exhaust pipe section 19 and the main exhaust passageway therein by the connecting tube 28. The connecting tube 28 includes an inner surface 44, which defines the connecting tube passageway 34. The connecting tube passageway 34 is arranged in fluid communication with both the combustion chamber 32 of the burner 26 and the main exhaust passageway 24 in the exhaust pipe section 19 and therefore carries the burner-generated heat and emissions (i.e., hot gas) to the exhaust pipe section 19.

In order to reduce burner-generated emissions, a catalytic washcoat 46 is applied to and disposed on the inner surface 44 of the connecting tube 28. The catalytic washcoat 46 comprises a mixture of a support material, a catalyst material, and optionally an oxygen storage material. The catalyst material is made of one or more platinum group metals (PGM), like platinum, palladium and rhodium, which chemically react with emissions generated by the burner 26. In the preferred embodiments, the support material is alumina and the oxygen storage material is cerium/zirconium oxide.

The mixture of support material and catalyst material is a "washcoat" that is applied as a water-based slurry and forms a layer or film of porous material on the inner surface 44 of the connecting tube 28. In the simplest configuration illustrated in FIGS. 3 and 4, the catalytic washcoat 46 is applied evenly across the entire inner surface 44 of the connecting tube 28. The effect of the catalyst material on the desired chemical reactions is limited by the mass transfer rate of the nitrogen oxides (NOx), carbon monoxide (CO), and hydrocarbons (HCs) to the catalytic washcoat 46. The mass transfer rate is increased by temperature and the motion of the hot gases in the connecting tube 28. As noted above, the design of the burner 26 imparts a swirling motion to the hot gases passing through the connecting tube 28, which enhances mass transfer of the pollutants to the catalytic washcoat 46, and thus increases the rates of the desired conversion reactions.

Preferably, the catalyst material in the catalytic washcoat 46 is a three-way catalyst (TWC) that chemically reacts with the nitrogen oxide (NOx), carbon monoxide (CO), and hydrocarbon (HC) emissions generated by the combustion of the air/fuel mixture within the combustion chamber 32 of the burner 26. Thus, this three-way catalyst (TWC) located in the connecting tube 28 is capable of "converting" each of these pollutants into a desired chemical product. More specifically, the three-way catalyst (TWC) converts nitrogen oxides (NOx) to Dinitrogen ($N_2$), which is a "chemical reduction" reaction where carbon monoxide (CO) serves as the chemical "reductant." The three-way catalyst (TWC) also converts both carbon monoxide (CO) and hydrocarbons (HCs) to carbon dioxide ($CO_2$), which is a "chemical oxidation" reaction where the oxygen (02) in the air supplied to the burner 26 serves as the chemical "oxidant."

The unique characteristics and functions of the three-way catalyst (TWC) make it the ideal catalyst for this particular application. When the burner 26 is in an ignition mode, the three-way catalyst (TWC) enables the carbon monoxide (CO) produced by the burner 26 to chemically reduce the nitrogen oxides (NOx) to Dinitrogen ($N_2$). This behavior is enabled by rhodium in the catalyst. In addition, the very low concentration of oxygen (02) in the hot gases produced by the burner 26 during ignition, which involves rich combustion and a very low air-fuel ratio (AFR), drives the oxygen storage material toward the "oxygen-depleted" state. However, before the oxygen storage material is completely depleted of oxygen, the oxygen storage material can provide oxygen for the oxidation of hydrocarbons (HCs) in the burner-generated emissions. Thus, all three pollutants (nitrogen oxide (NOx), carbon monoxide (CO), and hydrocarbon (HC)) can be converted by the catalytic washcoat 46 when the burner 26 is in the ignition mode at the beginning of the pre-heating operation.

Once operation of the burner 26 transitions to normal operation, which features lean combustion and a higher air-fuel ratio (AFR), the three-way catalyst (TWC) becomes highly active for the oxidation of carbon monoxide (CO) and hydrocarbons (HCs). At the beginning of this transition, the oxygen storage material is in the oxygen-depleted condition, which also enables the catalyst material to convert nitrogen oxides (NOx). As normal operation continues, the oxygen storage material will become "recharged" with oxygen. Thus, the use of a three-way catalyst to address burner-generated emissions is particularly advantageous, in that it enables pollutant conversion during both the burner's ignition process, which involves rich combustion, and the burner's normal mode operation, which involves lean combustion.

However, when the catalyst material has become "recharged" with oxygen following periods of sustained lean combustion, nitrogen oxide (NOx) conversion falls dramatically. Therefore, to enable the catalyst material to convert nitrogen oxides (NOx) for a lengthy period of lean operation, the amount of catalyst material that is applied to the connecting tube 28 must be significant. For this reason, the configurations described below, which enable more catalyst material to be located within the connecting tube 28 will enabled lower nitrogen oxide (NOx) emissions during the entire pre-heating process, and will enable longer pre-heating before nitrogen oxide (NOx) emissions become truly significant.

For some applications, both the ignition mode and the normal mode of burner operation may be utilized while the engine 12 is running, and more particularly, during cold starts of the engine 12 when pre-heating is not employed. In this case, emissions of pollutants from the burner 26 will occur once again, but they will represent only a small contribution relative to the emissions produced by the engine 12. If the burner 26 is located upstream of the diesel oxidation catalyst (DOC) 16 and the diesel particulate filter (DPF) 18, then the emissions from the burner 26 and the engine 12 will be converted and/or trapped by these exhaust system components. However, there has been interest in locating the burner assembly 20 downstream of the diesel oxidation catalyst (DOC) 16, which is able to convert carbon monoxide (CO) and hydrocarbons (HCs), and even downstream of the diesel particulate filter (DPF) 18, which is able to trap particulate matter (PM). When the burner assembly 20 is placed in these downstream locations, the emissions generated by the burner 26 will not be converted or trapped by the diesel oxidation catalyst (DOC) 16 and the diesel particulate filter (DPF) 18 and may be emitted to the environment. Thus, the inclusion of a catalyst material within the connecting tube 28 between the burner 26 and the exhaust pipe section 19 is particularly helpful by reducing the amount of tailpipe emissions that are contributed by the burner 26 when it is placed in these less-than-ideal locations for packaging or other reasons.

Optionally, the inner surface 44 of the connecting tube 28 includes perforations or corrugations over which the catalytic washcoat 46 is applied. For example, the inner surface 44 of the connecting tube 28 may include a ceramic honeycomb over which the catalytic washcoat 46 is applied. In other configurations, the connecting tube 28 may contain a metallic catalyst substrate upon which the catalytic washcoat 46 is applied.

Figures 5, 6:
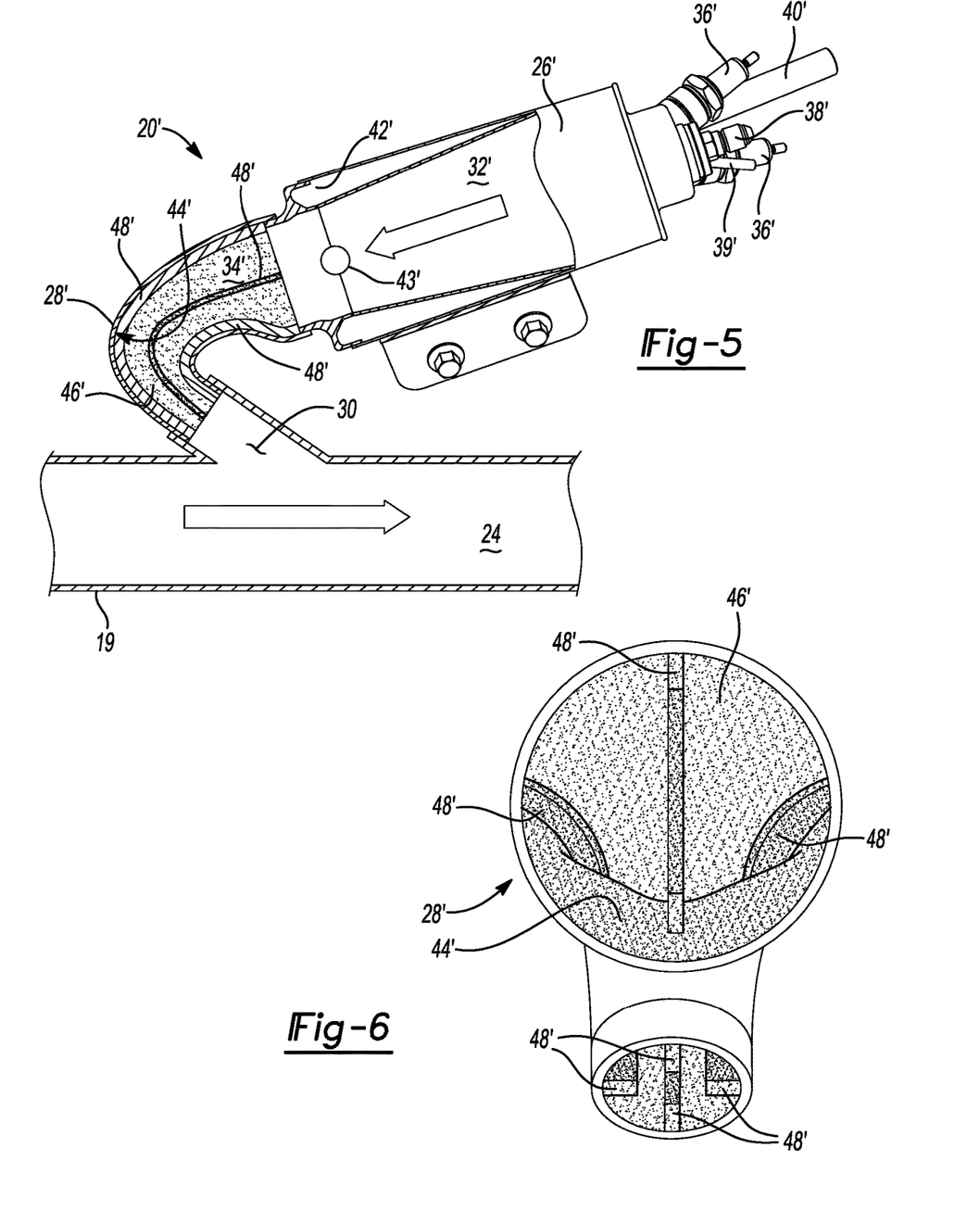
FIG. 5 is a side section view of another exemplary burner assembly that is constructed in accordance with another aspect of the present disclosure and includes a connecting tube with internal fins.
FIG. 6 is a front section view of the exemplary burner assembly illustrated in FIG. 5 taken along section line 6-6.

FIGS. 5 and 6 illustrate another embodiment of an exemplary burner assembly 20', which is substantially the same as the burner assembly 20 illustrated in FIGS. 1-4, but additionally includes one or more fins 48' positioned inside the connecting tube 28'. Thus, all of the elements of the burner assembly 20' shown in FIGS. 5 and 6 are the same or substantially the same as the burner assembly 20 shown in FIGS. 1-4. Because the elements of the burner assembly 20' shown in FIGS. 5 and 6 are the same or substantially the same as the burner assembly 20 shown in FIGS. 1-4, the corresponding elements in FIGS. 5 and 6 are identified with the same reference numbers used in FIGS. 1-4, but have a prime symbol (') appended after the reference number. Thus, it should be appreciated that the above description applies equally to the elements shown in FIGS. 5 and 6 and will not be repeated unnecessarily.

The connecting tube 28' of the burner assembly 20' illustrated in FIGS. 5 and 6 further includes one or more fins 48' that are attached to the inner surface 44' of the connecting tube 28'. The fins 48' extend from the inner surface 44' of the connecting tube 28' into the connecting tube passageway 34' and therefore interact with the flow of the hot gases exiting the combustion chamber 32' of the burner 26'. The catalytic washcoat 46' is disposed on the inner surface 44' of the connecting tube 28' and one or more surfaces of the fins 48' and therefore results in a larger surface area within the connecting tube 28' upon which the catalyst material resides. In the example shown in FIGS. 5 and 6 there are four fins 48' on the inner surface 44' of the connecting tube 28' at the 3 o'clock (90 degree), 6 o'clock (180 degree), 9 o'clock (270 degree), and 12 o'clock (360 degree) positions. These fins 48' extend longitudinally along the entire length of the connecting tube 28'. However, it should be appreciated that other shapes are possible. For example and without limitations, the fins 48' may be angled, curved, or extend in a helical path to cooperate with or enhance the swirling motion of the hot gases exiting the combustion chamber 32' of the burner 26'. The fins 48' may also be provided as ears or cut-outs in a mixer plate.

Figures 7, 8:
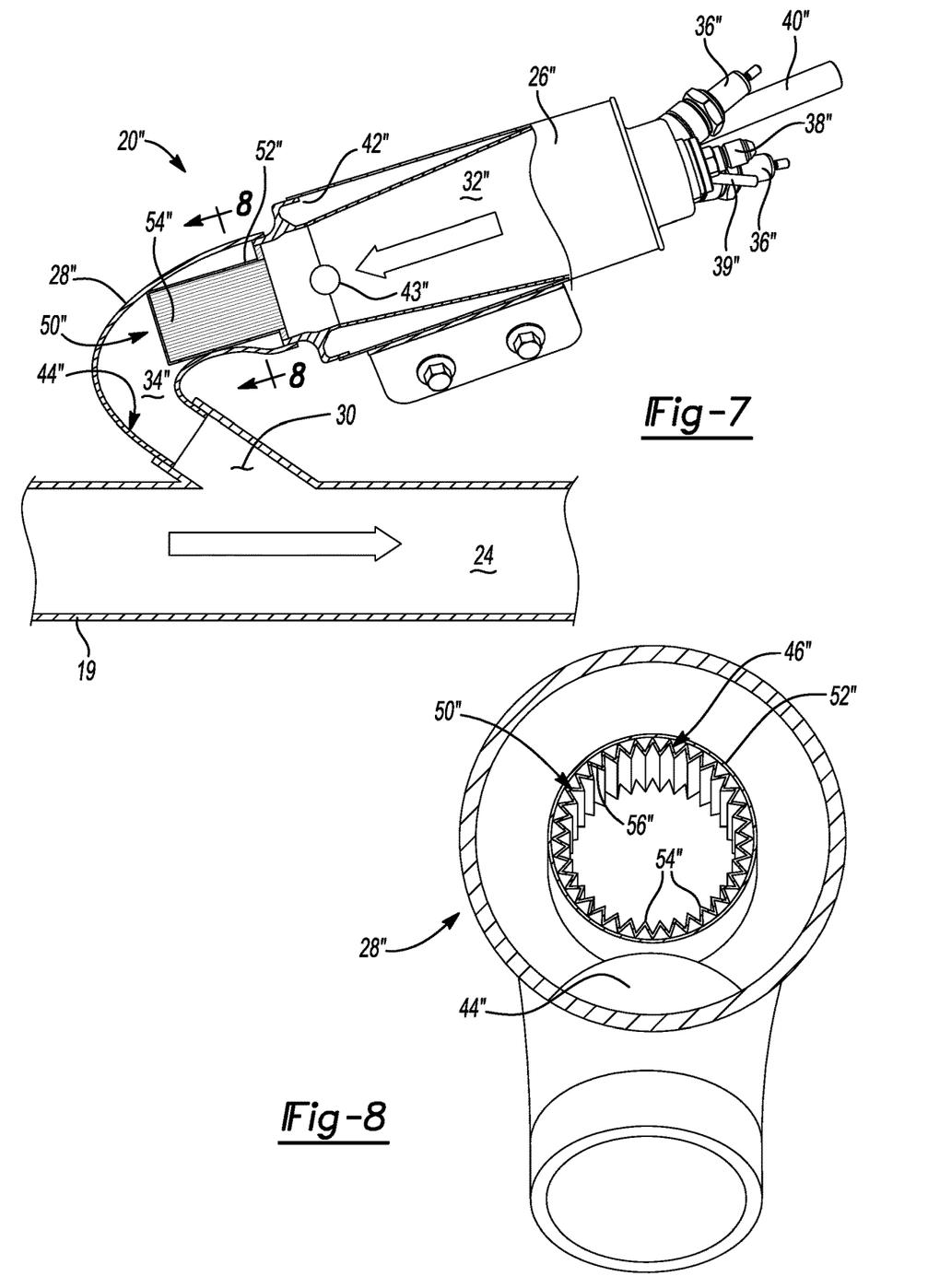
FIG. 7 is a side section view of another exemplary burner assembly that is constructed in accordance with another aspect of the present disclosure and includes a connecting tube with an internal filter element.
FIG. 8 is a front section view of the exemplary burner assembly illustrated in FIG. 7 taken along section line 8-8.

FIGS. 7 and 8 illustrate another embodiment of an exemplary burner assembly 20", which is substantially the same as the burner assembly 20 illustrated in FIGS. 1-4, but additionally includes a filter element 50" that is positioned inside the connecting tube 28". Thus, all of the elements of the burner assembly 20" shown in FIGS. 7 and 8 are the same or substantially the same as the burner assembly 20 shown in FIGS. 1-4. Because the elements of the burner assembly 20" shown in FIGS. 7 and 8 are the same or substantially the same as the burner assembly 20 shown in FIGS. 1-4, the corresponding elements in FIGS. 7 and 8 are identified with the same reference numbers used in FIGS. 1-4, but have a double prime symbol (") appended after the reference number. Thus, it should be appreciated that the above description applies equally to the elements shown in FIGS. 7 and 8 and will not be repeated unnecessarily.

The connecting tube 28" of the burner assembly 20" illustrated in FIGS. 7 and 8 further includes a filter element 50" that is positioned in the connecting tube passageway 34". In cross-section, the filter element 50" may extend across the entire connecting tube passageway 34" and may therefore filter 100 percent of the flow of hot gases that exit the burner 26" or alternatively may be a partial filter that extends across only part of the connecting tube passageway 34" and interacts with only part of the hot gas flow in the connecting tube 28". For example, the filter element 50" may include a cylindrical filter body 52" with a plurality of longitudinal pleats 54" that are arranged circumferentially within the connecting tube passageway 34".

The filter element 50" is made of a metallic mesh 56", which may be made of one or more layers of metallic "fleece" or a finely divided wire mesh and may be interspersed with metal foil layers with perforations that direct some of the flow through the metallic mesh. The filter element 50" has a porosity that permits burner-generated exhaust to flow through the filter element 50" while trapping soot/particulate matter (PM) generated by the burner 26". For example, the metallic mesh of the filter element 50" may be selected to have an average porosity of 2 to 15 micrometers (μm). The soot/particulate matter (PM) that becomes trapped within the filter element 50" eventually undergoes combustion because of the lean combustion conditions that occur in the combustion chamber 32" after the burner 26" switches from the ignition operating mode to the normal operation mode. In normal operation mode, there is an oxygen ($O_2$) rich environment in the connecting tube passageway 34" and the burner 26" produces nitrogen dioxide ($NO_2$) and very high temperatures in the connecting tube passageway 34" that can exceed 500 degrees Celsius (° C.). The nitrogen dioxide ($NO_2$) reacts with the trapped soot/particulate matter (PM) in the filter element 50", allowing it to be combusted (i.e., burn off) at the elevated temperatures inside the connecting tube passageway 34".

In accordance with this embodiment, the catalytic washcoat 46" may be applied to the inner surface 44" of the connecting tube 28" and/or metallic mesh of the filter element 50". For example, in configurations where the filter element 50" includes a metallic fleece, the catalytic washcoat 46" may be applied to at least partially coat the fibers of the metallic fleece. In configurations where the filter element 50" includes a wire mesh or screen, the catalytic washcoat 46" may be applied to at least partially coat the wire mesh. In configurations where the filter element 50" includes metal foils, the catalytic washcoat 46" may be applied to one or more surfaces of the metal foils. In addition, any number of these elements may be combined into a single or multiple filter elements 50". It should be appreciated that such configurations provide even more surface area inside the connecting tube 28" and thus enable a larger amount of the catalytic washcoat 46" to be deposited inside the connecting tube 28", but this benefit must be balanced with the tradeoff of a higher pressure drop (i.e., backpressure) across the connecting tube 28", which will drive different requirements for the amount of fuel and air introduced to the combustion chamber 32" of the burner 26".

A method for pre-heating an exhaust system 10 of a vehicle using the burner assemblies 20, 20', 20" described above is also provided. The following paragraphs reference the components of the burner assembly 20 shown in FIGS. 1-4; however, it should be appreciated that the following method applies equally to the burner assemblies 20', 20" shown in FIGS. 5-8. The method generally includes step 100 of injecting fuel into a combustion chamber 32 of a burner assembly 20 that is positioned in the exhaust system 10 upstream of a selective catalytic reduction (SCR) catalyst 22 at a first fuel injection rate and step 102 of supplying air to the combustion chamber 32 of the burner assembly 20 at a first flowrate. Together, the first flowrate of the air and the first fuel injection rate define a first air/fuel ratio within the combustion chamber 32. The method then proceeds with the step 104 of igniting an air/fuel mixture within the combustion chamber 32 of the burner assembly 20 and step 106 of maintaining the first air/fuel ratio for a pre-determined start-up period, which results in the generation of heat and emissions within the combustion chamber 32. The first air/fuel ratio may be selected to create a fuel rich combustion environment within the combustion chamber 32 of the burner assembly 20 to promote ignition and the initiation of stable combustion within the burner assembly 20. The duration of the pre-determined start-up period may vary based on conditions and application, but the pre-determined start-up period may last from 5 to 15 seconds. The method then proceeds with step 108 of starting an engine 12 of the vehicle a period of time after the ignition of the air/fuel mixture within the combustion chamber 32 of the burner assembly 20 and step 110 of routing the heat and emissions generated in the combustion chamber 32 through a connecting tube 28, which includes a catalytic washcoat 46 and leads to an exhaust pipe section 19 that is positioned upstream of the selective catalytic reduction (SCR) catalyst 22.

Figure 9:
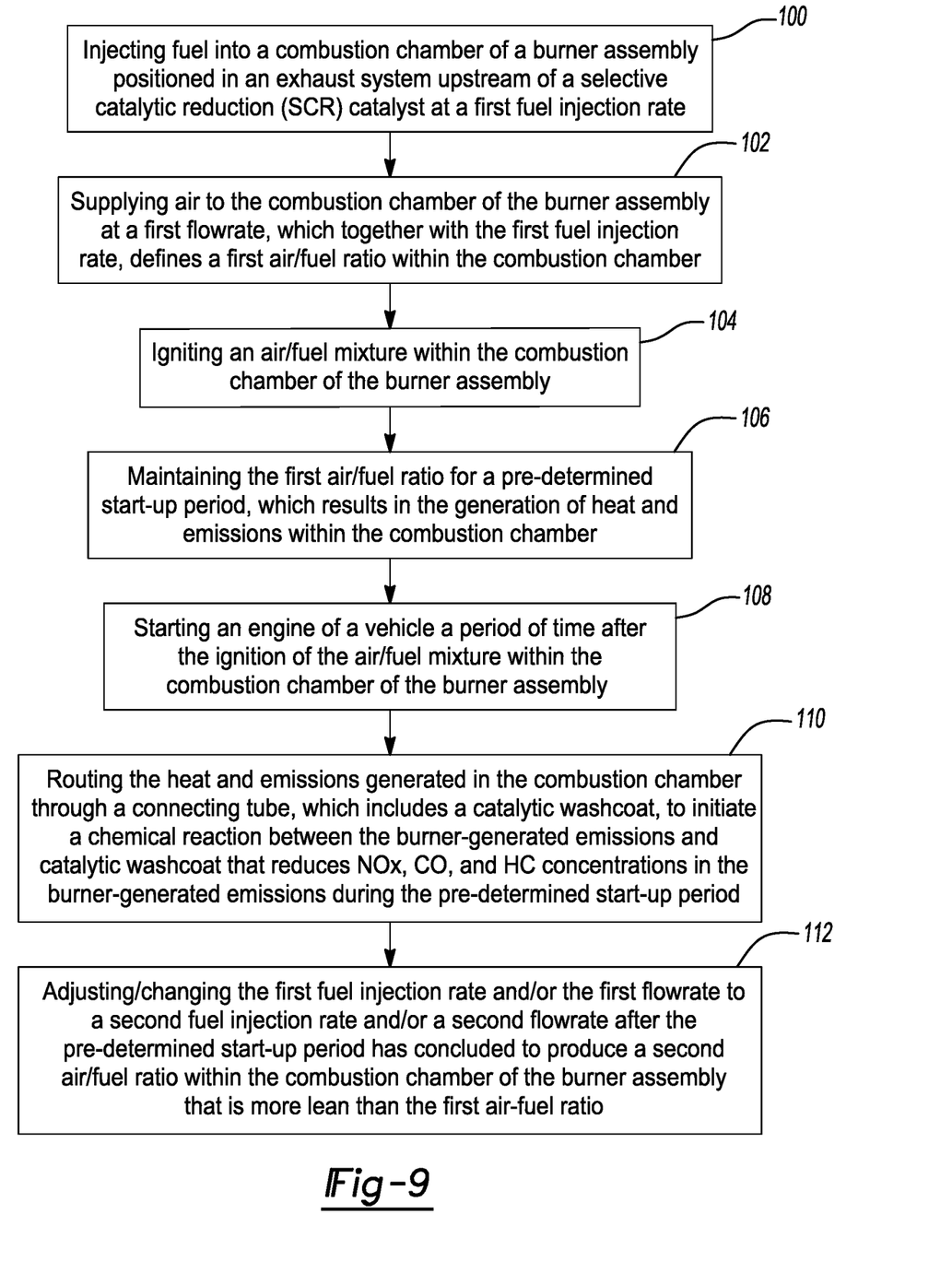
FIG. 9 is a flow chart illustrating a method of pre-heating an exhaust system of a vehicle using the exemplary burner assemblies disclosed herein.

As discussed above, the catalytic washcoat 46 in the connecting tube 28 initiates a chemical reaction with the burner-generated emissions passing through the connecting tube 28 to reduce nitrogen oxide (NOx), carbon monoxide (CO), and hydrocarbon (HC) concentrations in the emissions generated by the burner assembly 20 during the pre-determined start-up period. In addition, the catalytic washcoat 46 may be applied by spraying a water-based mixture of alumina, cerium/zirconium oxide, and at least one platinum group metal (PGM) onto an inner surface 44 of the connecting tube 28 and/or at least one surface of a filter element 50" positioned in the connecting tube 28.

The method may also include step 112 of adjusting/changing the first fuel injection rate and/or the first flowrate of the air to a second fuel injection rate and/or a second flowrate after the pre-determined start-up period has concluded to produce a second air/fuel ratio within the combustion chamber 32 of the burner assembly 20 that is more lean (i.e., is more oxygen ($O_2$) rich) than the first air-fuel ratio. Therefore, step 112 places the burner assembly 20 in a normal operating mode.

The method may also involve passing the emissions generated by the burner assembly 20" through a filter element 50" located in the connecting tube 28" to trap particulate matter generated by the burner assembly 20" during the pre-determined start-up period and initiate a chemical reaction between the particulate matter trapped in the filter element 50" and nitrogen di-oxide ($NO_2$) in the emissions generated by the burner assembly 20" after the predetermined start-up period. This allows the particulate matter trapper in the filter element 50" to burn-off, which cleans/regenerates the filter element 50".

Many modifications and variations of the present disclosure are possible in light of the above teachings and may be practiced otherwise than as specifically described while within the scope of the appended claims. These antecedent recitations should be interpreted to cover any combination in which the inventive novelty exercises its utility. With respect to the methods set forth herein, the order of the steps may depart from the order in which they appear without departing from the scope of the present disclosure and the appended method claims. Additionally, various steps of the method may be performed sequentially or simultaneously in time.

What is claimed is:

1. An exhaust system for a vehicle, comprising:
an exhaust pipe section defining a main exhaust passageway therein;
a selective catalytic reduction (SCR) catalyst arranged in fluid communication with and positioned downstream of the exhaust pipe section; and
a burner assembly connected to the exhaust pipe section, the burner assembly including a burner with a combustion chamber disposed therein, an igniter for initiating fuel combustion in the combustion chamber, and a connecting tube extending between an outlet of the combustion chamber and the exhaust pipe section,
wherein the connecting tube includes an inner surface defining a connecting tube passageway that is arranged in fluid communication with the combustion chamber of the burner and the main exhaust passageway in the exhaust pipe section,
wherein a catalytic washcoat is disposed on the inner surface of the connecting tube, the catalytic washcoat comprising a mixture of a support material and a catalyst material made of one or more platinum group metals (PGM) that chemically react with emissions generated by the burner.

2. The exhaust system of claim 1, wherein the catalyst material in the catalytic washcoat is a three-way catalyst (TWC) that chemically reacts with nitrogen oxide (NOx), carbon monoxide (CO), and hydrocarbon (HC) emissions generated by the combustion of an air/fuel mixture within the combustion chamber of the burner.

3. The exhaust system of claim 1, wherein the catalytic washcoat further comprises an oxygen storage material.

4. The exhaust system of claim 1, wherein the support material in the catalytic washcoat is alumina.

5. The exhaust system of claim 1, wherein the inner surface of the connecting tube includes perforations, corrugations, or a ceramic honeycomb over which the catalytic washcoat is applied.

6. The exhaust system of claim 1, wherein the inner surface of the connecting tube includes one or more fins that project into the combustion chamber and the catalytic washcoat is disposed on at least one surface of the fins.

7. The exhaust system of claim 1, wherein the catalytic washcoat is a water-based slurry that is applied to the inner surface of the connecting pipe, which dries to form a film on the inner surface of the connecting pipe.

8. An exhaust system for a vehicle, comprising:
an exhaust pipe section defining a main exhaust passageway therein;
a selective catalytic reduction (SCR) catalyst arranged in fluid communication with and positioned downstream of the exhaust pipe section;
a burner assembly positioned in a side branch connected to the exhaust pipe section, the burner assembly including a burner with a combustion chamber disposed therein, an igniter for initiating fuel combustion in the combustion chamber, and a connecting tube extending between an outlet of the combustion chamber and the exhaust pipe section, the connecting tube including a connecting tube passageway having an inlet that is arranged in fluid communication with the combustion chamber of the burner and an outlet in fluid communication with the main exhaust passageway in the exhaust pipe section; and
a filter element positioned in the connecting tube passageway that is made of a metallic mesh and has a porosity that permits burner generate exhaust to flow through the filter element while trapping particulate matter generated by the burner.

9. The exhaust system of claim 8, wherein the metallic mesh of the filter element is constructed as a wire mesh.

10. The exhaust system of claim 8, wherein the metallic mesh of the filter element is constructed as a metallic fleece of sintered metal fibers.

11. The exhaust system of claim 8, wherein the metallic mesh of the filter element has an average porosity of 2 to 15 micrometers (μm).

12. The exhaust system of claim 8, wherein the filter element has a cylindrical filter body with a plurality of longitudinal pleats that are made of the metallic mesh and are arranged circumferentially within the connecting tube passageway.

13. An exhaust system for a vehicle, comprising:
an exhaust pipe section defining a main exhaust passageway therein;
a selective catalytic reduction (SCR) catalyst arranged in fluid communication with and positioned downstream of the exhaust pipe section;
a burner assembly positioned in a side branch connected to the exhaust pipe section, the burner assembly including a burner with a combustion chamber disposed therein, an igniter for initiating fuel combustion in the combustion chamber, and a connecting tube extending between an outlet of the combustion chamber and the exhaust pipe section, the connecting tube including a connecting tube passageway having an inlet that is arranged in fluid communication with the combustion chamber of the burner and an outlet in fluid communication with the main exhaust passageway in the exhaust pipe section; and
a filter element positioned in the connecting tube passageway that is made of a metallic mesh and has a porosity that permits burner generate exhaust to flow through the filter element while trapping particulate matter generated by the burner,
wherein a catalytic washcoat at least partially coats the metallic mesh of the filter element, the catalytic washcoat comprising a mixture of a support material and a catalyst material made of one or more platinum group metals (PGM) that chemically react with emissions generated by the burner.

14. The exhaust system of claim 8, wherein a catalytic washcoat is disposed on an inner surface of the connecting tube, the catalytic washcoat comprising a mixture of a support material and a catalyst material made of one or more platinum group metals (PGM) that chemically react with emissions generated by the burner.

15. A method for pre-heating an exhaust system of a vehicle, the method comprising the steps of:
injecting fuel into a combustion chamber of a burner assembly positioned in the exhaust system upstream of a selective catalytic reduction (SCR) catalyst at a first fuel injection rate;
supplying air to the combustion chamber of the burner assembly at a first flowrate that, together with the first fuel injection rate, defines a first air/fuel ratio within the combustion chamber;
igniting an air/fuel mixture within the combustion chamber of the burner assembly resulting in the generation of heat and emissions within the combustion chamber;
maintaining the first air/fuel ratio for a pre-determined start-up period;
starting an engine of the vehicle a period of time after the ignition of the air/fuel mixture within the combustion chamber of the burner assembly; and
routing the heat and emissions generated in the combustion chamber through a connecting tube that includes a catalytic washcoat and leads to an exhaust pipe section that is positioned upstream of the selective catalytic reduction (SCR) catalyst,
wherein the catalytic washcoat in the connecting tube initiates a chemical reaction with the emissions passing through the connecting tube to reduce nitrogen oxide (NOx), carbon monoxide (CO), and hydrocarbon (HC) concentrations in the emissions generated by the burner assembly during the pre-determined start-up period.

16. The method of claim 15, further comprising the step of:
adjusting at least one of the first fuel injection rate and the first flowrate after the pre-determined start-up period has concluded to produce a second air/fuel ratio within the combustion chamber of the burner assembly that is more lean than the first air-fuel ratio; and
passing the emissions generated by the burner assembly through a filter element located in the connecting tube to trap particulate matter generated by the burner assembly during the pre-determined start-up period and initiate a chemical reaction between the particulate matter trapped in the filter element and nitrogen dioxide ($NO_2$) in the emissions generated by the burner assembly after the predetermined start-up period.

17. The method of claim 16, wherein the pre-determined start-up period lasts five to fifteen seconds.

18. The method of claim 15, wherein the first air/fuel ratio creates a fuel rich combustion environment within the combustion chamber of the burner assembly.

19. The method of claim 15, wherein the catalytic washcoat is applied by spraying a water-based mixture of alumina, cerium/zirconium oxide, and at least one platinum group metal (PGM) onto an inner surface of the connecting tube.

20. The method of claim 15, wherein the catalytic washcoat is applied by spraying a water-based mixture of alumina, cerium/zirconium oxide, and at least one platinum group metal (PGM) onto at least one surface of a filter element positioned in the connecting tube.

* * * * *